United States Patent
Deka et al.

(10) Patent No.: US 12,134,260 B2
(45) Date of Patent: *Nov. 5, 2024

(54) SUPER INSULATING NANO-SPHERES FOR APPLIANCE INSULATION AND METHOD FOR CREATING A SUPER INSULATING NANO-SPHERE MATERIAL

(71) Applicant: Whirlpool Corporation, Benton Harbor, MI (US)

(72) Inventors: Lakshya J. Deka, Mishawaka, IN (US); Rameet Singh Grewal, Pune (IN); Andrea Olivani, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,038

(22) Filed: Aug. 24, 2023

(65) Prior Publication Data
US 2023/0391047 A1 Dec. 7, 2023

Related U.S. Application Data

(60) Continuation of application No. 17/564,278, filed on Dec. 29, 2021, now Pat. No. 11,787,151, which is a continuation of application No. 16/852,672, filed on Apr. 20, 2020, now Pat. No. 11,247,432, which is a continuation of application No. 16/126,097, filed on Sep. 10, 2018, now Pat. No. 10,661,527, which is a division of application No. 14/961,929, filed on Dec. 8, 2015, now Pat. No. 10,105,928.

(51) Int. Cl.
| | | |
|---|---|---|
| B32B 5/16 | (2006.01) | |
| B29C 70/66 | (2006.01) | |
| B32B 37/14 | (2006.01) | |
| F25D 23/06 | (2006.01) | |
| B29K 105/00 | (2006.01) | |
| B29K 105/04 | (2006.01) | |
| B29L 31/00 | (2006.01) | |

(52) U.S. Cl.
CPC .............. *B32B 5/16* (2013.01); *F25D 23/062* (2013.01); *B29C 70/66* (2013.01); *B29K 2105/0076* (2013.01); *B29K 2105/041* (2013.01); *B29L 2031/7622* (2013.01); *B32B 37/14* (2013.01); *B32B 2307/102* (2013.01); *B32B 2307/304* (2013.01); *B32B 2509/10* (2013.01); *F25D 2201/12* (2013.01); *Y02B 40/00* (2013.01)

(58) Field of Classification Search
None
See application file for complete search history.

(56) References Cited

U.S. PATENT DOCUMENTS

| | | | |
|---|---|---|---|
| 4,303,732 A | 12/1981 | Torobin | |
| 4,781,968 A | 11/1988 | Kellerman | |
| 4,865,875 A | 9/1989 | Kellerman | |
| 5,171,346 A | 12/1992 | Hallett | |
| 10,105,928 B2 * | 10/2018 | Deka | F25D 23/062 |
| 10,661,527 B2 * | 5/2020 | Deka | F25D 23/062 |
| 11,247,432 B2 * | 2/2022 | Deka | F25D 23/062 |
| 11,787,151 B2 * | 10/2023 | Deka | F25D 23/062 428/323 |
| 2002/0004111 A1 | 1/2002 | Matsubara et al. | |
| 2006/0000155 A1 * | 1/2006 | Wagner | D04H 1/02 52/22 |
| 2008/0044488 A1 | 2/2008 | Zimmer et al. | |
| 2015/0011668 A1 | 1/2015 | Kolb et al. | |
| 2015/0017386 A1 | 1/2015 | Kolb et al. | |
| 2018/0066131 A1 | 3/2018 | Jin et al. | |
| 2022/0118737 A1 | 4/2022 | Deka et al. | |

FOREIGN PATENT DOCUMENTS

| | | |
|---|---|---|
| CN | 102180639 A | 9/2011 |
| DE | 19914105 A1 | 9/2000 |
| EP | 2889526 A1 | 7/2015 |
| JP | 2001287291 A | 10/2001 |
| JP | 2002068853 A | 3/2002 |
| JP | 2003074786 A | 3/2003 |
| RU | 2081858 C1 | 6/1997 |

(Continued)

OTHER PUBLICATIONS

Raszewski et al., "Methods For Producing Hollow Glass Microspheres," Powerpoint, cached from Google, Jul. 2009, 6 pages.

(Continued)

*Primary Examiner* — Sheeba Ahmed (74) *Attorney, Agent, or Firm* — Price Heneveld LLP (57) ABSTRACT

An insulating structure for an appliance includes an outer layer and an inner layer, wherein an insulating cavity is defined therebetween. A plurality of hollow nano-spheres are disposed within the insulating cavity, wherein each of the hollow nano-spheres includes a diameter in the range of from approximately 50 nanometers to approximately 1000 nanometers and has a wall that defines the internal space, and wherein the wall of each hollow nano-sphere has a thickness that is in a range of from approximately 0.5 nanometers to approximately 100 nanometers. A fill material is disposed in the insulating cavity and wherein the fill material is disposed in the space defined between the plurality of hollow nano-spheres, and wherein the fill material includes at least one of powdered silica, granulated silica, other silica material, aerogel and insulating gas.

20 Claims, 9 Drawing Sheets

(56) References Cited

FOREIGN PATENT DOCUMENTS

| | | |
|---|---|---|
| RU | 2422598 C2 | 6/2011 |
| WO | 9721767 A1 | 6/1997 |
| WO | 2007011988 A2 | 1/2007 |
| WO | 2008065453 A1 | 6/2008 |
| WO | 2012065288 A1 | 5/2012 |
| WO | 2013116103 A1 | 8/2013 |
| WO | 2013116302 A1 | 8/2013 |

OTHER PUBLICATIONS

Cai et al., "Generation of Metal Nanoparticles By Laser Ablation of Microspheres," J. Aerosol Sci., vol. 29, No. 5/6 (1998), pp. 627-636.

* cited by examiner

SUPER INSULATING NANO-SPHERES FOR APPLIANCE INSULATION AND METHOD FOR CREATING A SUPER INSULATING NANO-SPHERE MATERIAL

CROSS-REFERENCE TO RELATED APPLICATION

The present application is a continuation of U.S. patent application Ser. No. 17/564,278 filed Dec. 29, 2021, now U.S. Pat. No. 11,787,151, which is a continuation of U.S. patent application Ser. No. 16/852,672 filed Apr. 20, 2020, now U.S. Pat. No. 11,247,432, which is a continuation of U.S. patent application Ser. No. 16/126,097 filed Sep. 10, 2018, now U.S. Pat. No. 10,661,527, which is a divisional of U.S. patent application Ser. No. 14/961,929 filed Dec. 8, 2015, now U.S. Pat. No. 10,105,928, all of which are entitled SUPER INSULATING NANO-SPHERES FOR APPLIANCE INSULATION AND METHOD FOR CREATING A SUPER INSULATING NANO-SPHERE MATERIAL, the entire disclosures of which are hereby incorporated herein by reference.

BACKGROUND

This device is in the field of insulating materials for appliances, specifically, insulating for appliances including hollow glass nano-spheres for providing super insulating properties to the appliance.

SUMMARY

In at least one aspect, an insulating structure for an appliance includes an outer layer and an inner layer, wherein an insulating cavity is defined therebetween. A plurality of hollow nano-spheres are disposed within the insulating cavity, wherein each of the hollow nano-spheres includes a diameter in the range of from approximately 50 nanometers to approximately 1000 nanometers and has a wall that defines the internal space, and wherein the wall of each hollow nano-sphere has a thickness that is in a range of from approximately 0.5 nanometers to approximately 100 nanometers. A fill material is disposed in the insulating cavity and wherein the fill material is disposed in the space defined between the plurality of hollow nano-spheres, and wherein the fill material includes at least one of powdered silica, granulated silica, other silica material, nano aerogel powder, pearlite, rice husk ash, diatomaceous earth and insulating gas.

In at least another aspect, a method for forming an insulating material for an appliance includes providing a glass material separated into nano-sized particles, projecting a blowing agent through a flame, wherein the nano-sized particles are fed through the flame with the blowing agent, wherein the blowing agent decomposes and releases a heated gas, wherein the heated gas causes the nano-sized particles to expand into corresponding hollow nano-spheres and disposing the hollow nano-spheres into an insulating cavity of an insulating structure of an appliance.

In at least another aspect, a method for forming an insulating material includes providing a glass material formed into a plurality of nano-sized particles having a diameter in a range of from approximately 50 nanometers to approximately 300 nanometers and projecting a blowing agent through a flame. The nano-sized particles are fed through the flame with the blowing agent, wherein the blowing agent decomposes and releases a heated gas, wherein the heated gas causes the nano-sized particles to expand into corresponding hollow nano-spheres, and wherein the nano-particles within the blowing agent are positioned in an agglomerated pattern, wherein expansion of the nano-sized particles in the agglomerated pattern results in the hollow nano-spheres defining a plurality of connected hollow nano-sphere formations.

These and other features, advantages, and objects of the present device will be further understood and appreciated by those skilled in the art upon studying the following specification, claims, and appended drawings.

DETAILED DESCRIPTION OF EMBODIMENTS

Figure 1:
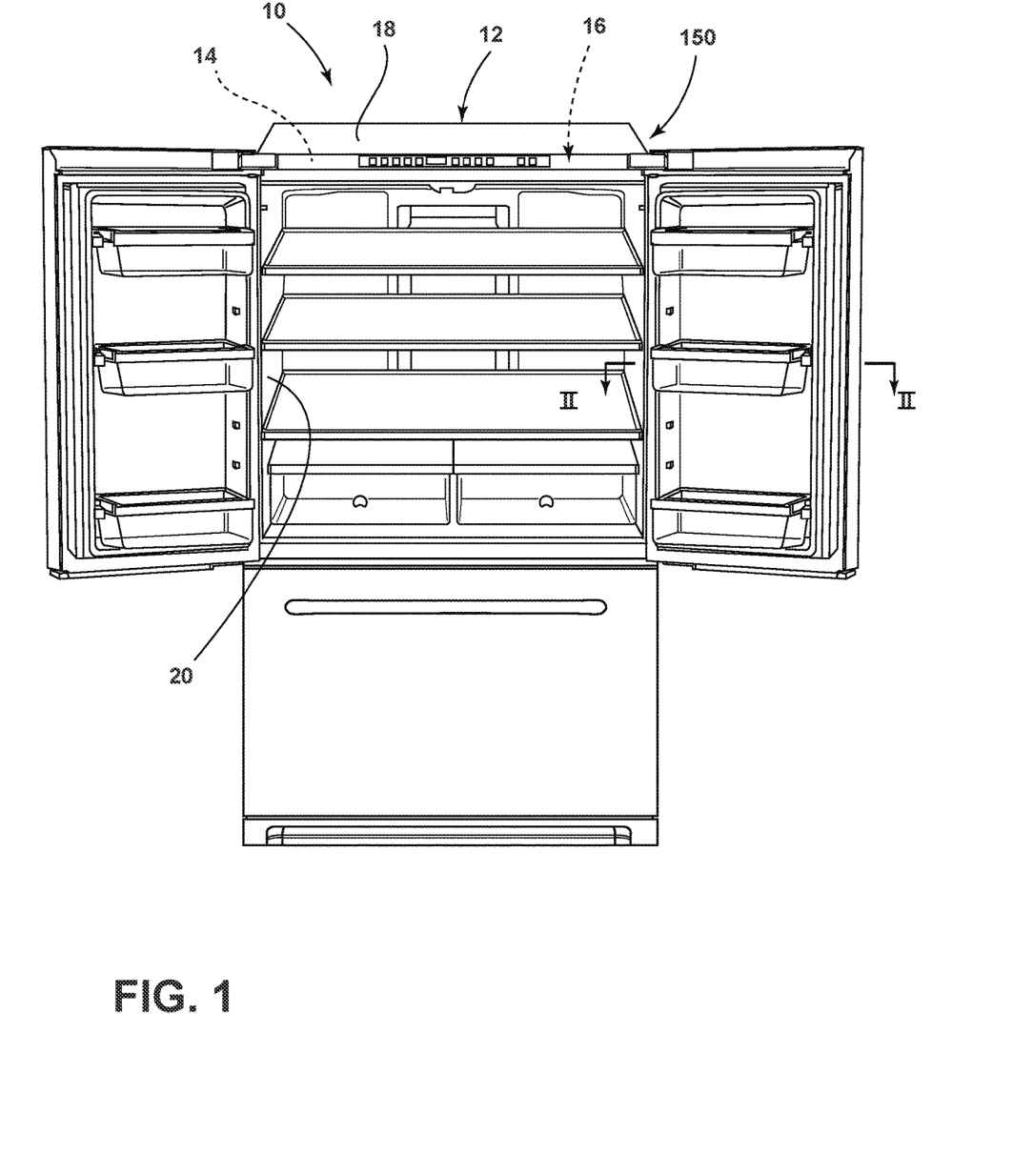
FIG. 1 is a front elevational view of a refrigerating appliance incorporating an aspect of the super insulating nano-sphere material.
Figure 2:
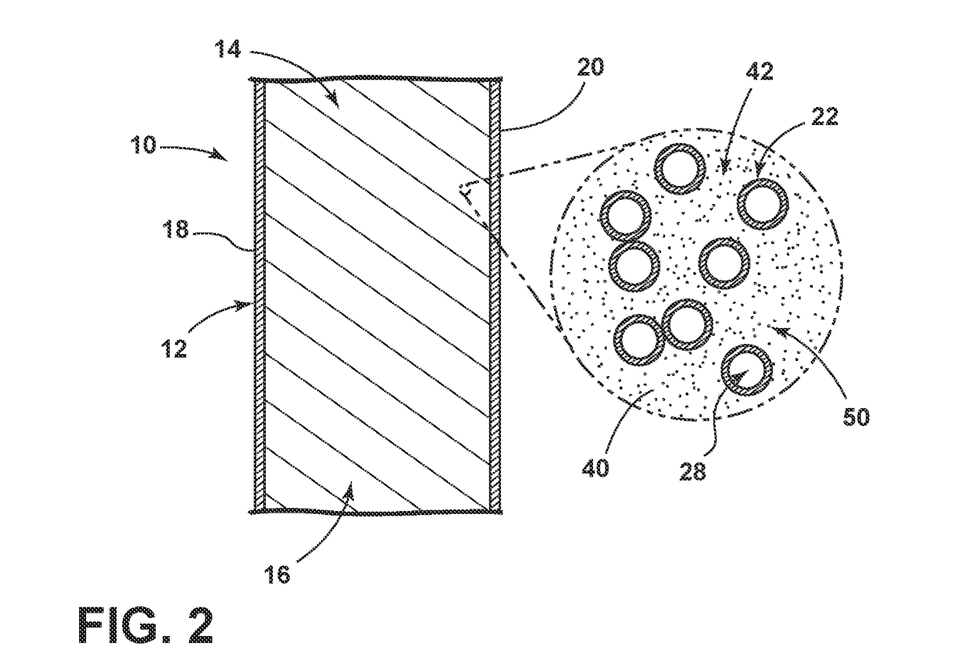
FIG. 2 is a partial cross section of a wall portion of the appliance of FIG. 1 illustrating an enlarged section of the insulating material within the insulating cavity.
Figure 3:
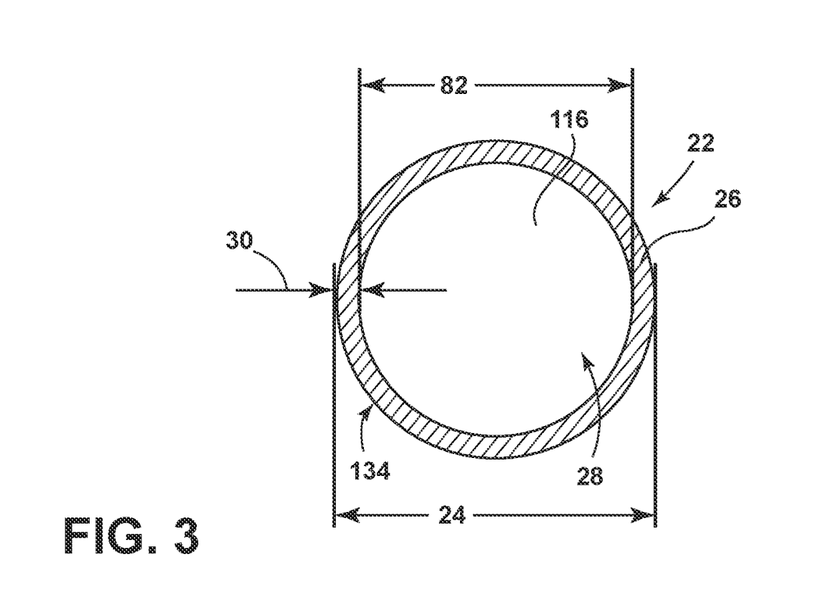
FIG. 3 is a cross-sectional view of an aspect of a super insulating microsphere.
Figure 4:
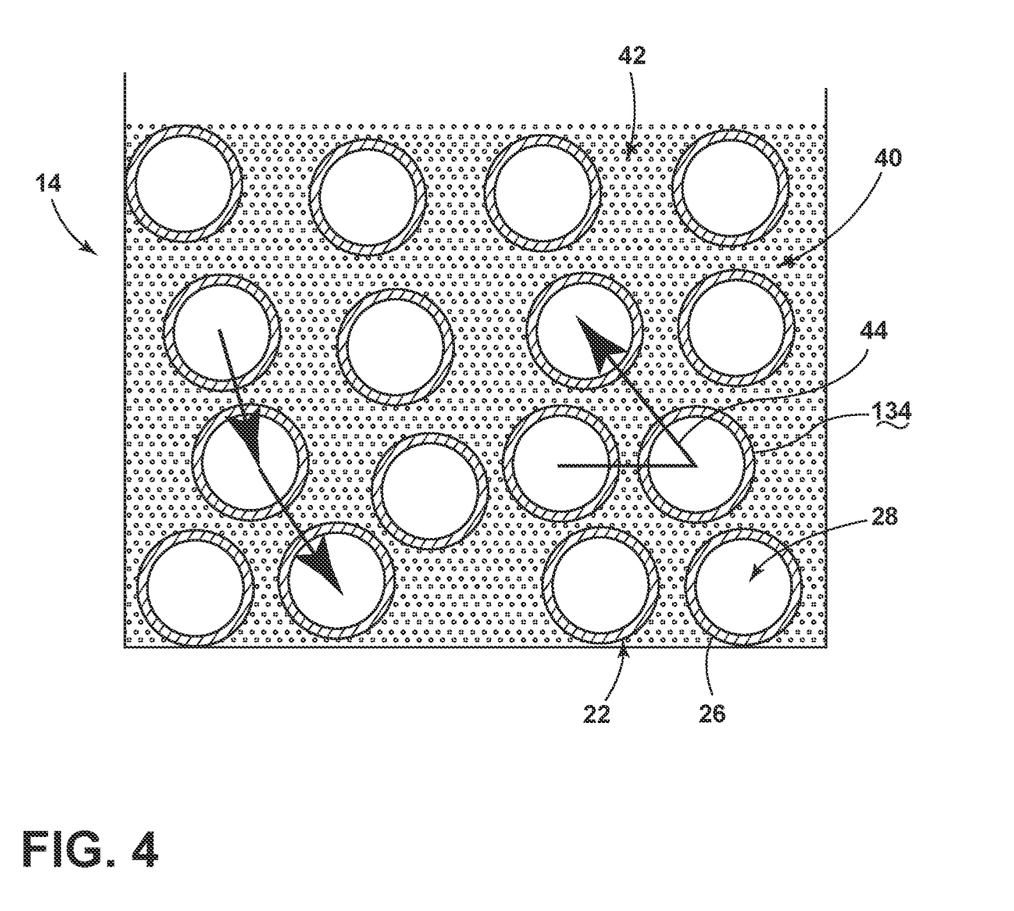
FIG. 4 is a cross-sectional view of an insulating material incorporating a plurality of super insulating nano-spheres set within a fill material.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-4, reference numeral 10 generally refers to an appliance having an insulating structure 12 into which an insulating material 14 is disposed. Various appliances 10, such as refrigerators, freezers, ovens, dishwashers, laundry appliances, water heaters, furnaces, and other similar appliances can include an insulating structure 12 therein for providing thermal and, in some instances, acoustical insulation for the appliance 10. According to various aspects of the embodiment, the insulating structure 12 for the appliance 10 can include an outer layer and an inner layer, where an insulating cavity 16 is defined between the outer layer and the inner layer. It is contemplated that, according to various aspects of the disclosure, such as in a refrigerating appliance, the outer layer can define an outer wrapper 18 and the inner layer can define an inner liner 20, where the outer wrapper 18 and inner liner 20 cooperate to partially define the insulating structure 12 of the appliance 10 with the insulating cavity 16 defined therein. According to various aspects of the device, a plurality of hollow nano-spheres 22 can be disposed within the insulating cavity 16, wherein each of the hollow nano-spheres 22 includes a nano-sphere diameter 24 in the range of from approximately 50 nanometers to approximately 1000 nanometers. According to various aspects of the device, the hollow nano-spheres 22 can include a wall 26 that defines an internal space 28, wherein the wall 26 of each of the hollow nano-spheres 22 has a wall thickness 30 that is in a range from approximately 0.5 nanometers to approximately 100 nanometers.

As exemplified in FIGS. 1-4, it is contemplated that fill material 40 can be disposed in the insulating cavity 16, such that the fill material 40 is disposed in the interstitial space 42 defined between the plurality of hollow nano-spheres 22. The fill material 40 can include at least one of powdered silica, granulated silica, other silica material, nano aerogel powder, pearlite, rice husk ash, diatomaceous earth, insulating gas 50, combinations thereof, and other similar insulating-type materials. It is also contemplated that the fill material 40 can be disposed within the insulating cavity 16 to define the various interstitial spaces 42 defined between the hollow nano-spheres 22. In this manner, substantially all or all of the insulating cavity 16 can be filled with insulating material 14 made up of the hollow nano-spheres 22 and/or one or more of the fill materials 40, such that the entire insulating cavity 16 is filled with insulating material 14. It is contemplated that the hollow nano-spheres 22 can be configured to be spaced apart from one another and within the fill material 40 such that conductivity between the various hollow nano-spheres 22 is limited to prevent conduction of thermal energy 44 through the super-insulating material 14 formed through the hollow nano-spheres 22 and the fill material 40.

Referring again to FIGS. 1-4, it is contemplated that where the fill material 40 is an insulating gas 50, such insulating gas 50 can include at least one of argon, carbon dioxide, neon, krypton, xenon, combinations thereof, and other similar insulating gasses. As described above, the insulating gas 50 that is used as the fill material 40 is configured to occupy spaces between the hollow nano-spheres 22 and between the solid and/or particulate forms of fill material 40, such that the entire insulating cavity 16 is occupied by the insulating material 14 of the hollow nano-spheres 22 and/or or a fill material 40 to enhance the insulating properties of the insulating structure 12 of the appliance 10.

Figure 5:
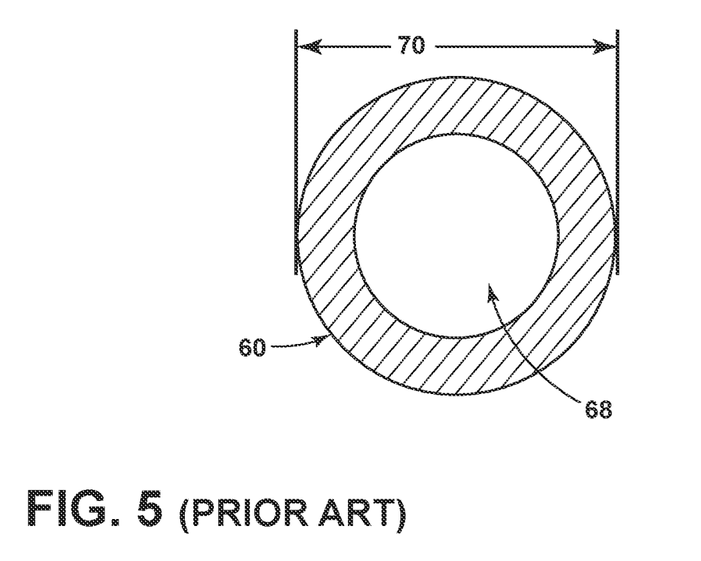
FIG. 5 is a cross-sectional view of a prior art glass microsphere.
Figure 6:
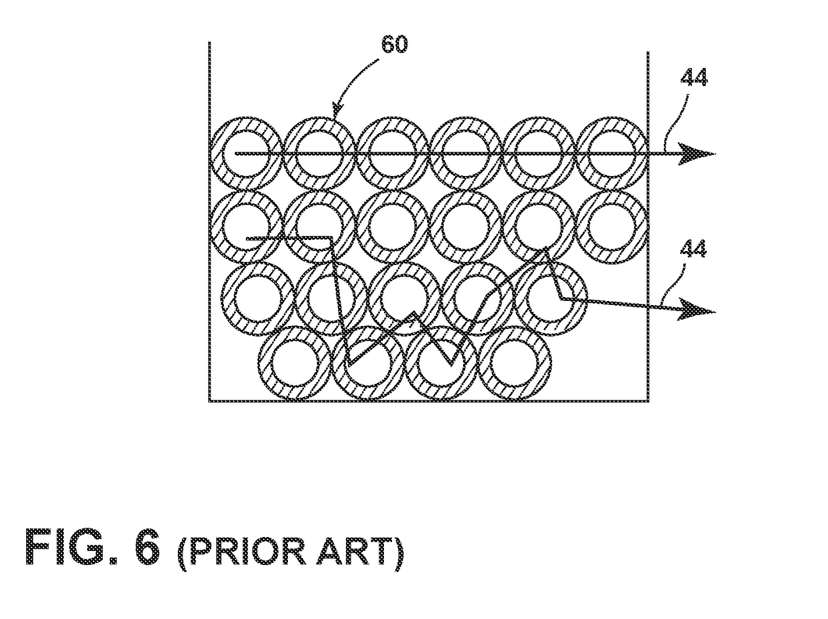
FIG. 6 is a schematic cross-sectional view of a prior art insulating material incorporating the prior art glass microspheres.

Referring now to the prior art devices illustrated in FIGS. 5 and 6, glass hollow microspheres 60 are known where during the manufacturing process, soda-lime silicate or sodium borosilicate glass is subjected to a milling operation. Milled particles or poured glass is fed through a blowing agent 62 through a flame 64. The blowing agent 62 decomposes within the flame 64 and releases gas 66 at an elevated temperature of from approximately 1100° C. to approximately 1400° C. This gas 66 that is generated from the decomposed blowing agent 62 contains mostly sulfur containing compounds. The released gas 66 causes the glass particles to expand, thereby resulting in the hollow spaces 68 of the microspheres 60 formed within the glass particles. Conventional hollow microspheres 60 resulting from this process tend to have a thermal conductivity of between 7 mw/mk to 18 mw/mk at approximately 1 to approximately 10 millibar vacuum pressure for vacuum insulated panels and structures. These thermal conductivity levels are achieved under the current hollow microspheres 60 having microsphere diameters 70 of between 15 to 150 microns. Additionally, current hollow microspheres 60 have a packing efficiency of 60-74% depending upon the uniformity of size of the hollow microspheres 60, particle size, particle distribution and densifying method.

Referring now to FIGS. 3, 4, 7 and 11, it is contemplated that smaller nano-particles 80 of insulating material 14, in the form of soda-lime glass, borosilicate glass, fumed silica, precipitated silica, powder aerogels, and other similar insulating materials 14 that have a diameter of from approximately 7 nanometers to approximately 300 nanometers can be used to generate the hollow nano-spheres 22. Nano-particles 80 of this size, when fed with the blowing agent 62 through the flame 64 and melted at the elevated temperature as a result of the released gas 66 caused by the decomposition of the blowing agent 62 can result in hollow nano-spheres 22 having a nano-sphere diameter 24 of from approximately 300 nanometers to approximately 1000 nanometers. Smaller sizes of the hollow nano-spheres 22 increases the packing efficiency of the insulating material 14 and reduces solid and gas conduction. Gas conduction can be reduced due to the reduction of volume defined by empty interstitial spaces 42 between the hollow nano-spheres 22. It is contemplated that each of the hollow nano-spheres 22 can have an internal space 28 having an internal diameter 82 of approximately 40 to 900 nanometers. This internal space 28 within the hollow nano-sphere 22 can trap various gas molecules, such as sulfur dioxide, oxygen, carbon dioxide and other gasses and/or insulating gasses 50 to tightly collide with each other. This configuration will eventually reduce gas conduction within the individual particles via collision. Solid conduction of the insulating material 14 having the hollow nano-spheres 22 can be diminished due to the decrease in wall thickness 30 of each of the hollow nano-spheres 22. The wall thickness 30 of each of the hollow nano-spheres 22 can be within a range of approximately 0.5 nanometers to approximately 100 nanometers or less. Pluralities of these hollow nano-spheres 22 can be formed in varying configurations and combinations for providing differing insulation characteristics depending upon the design of the appliance 10. These varying designs will be described more fully below.

Figure 7:
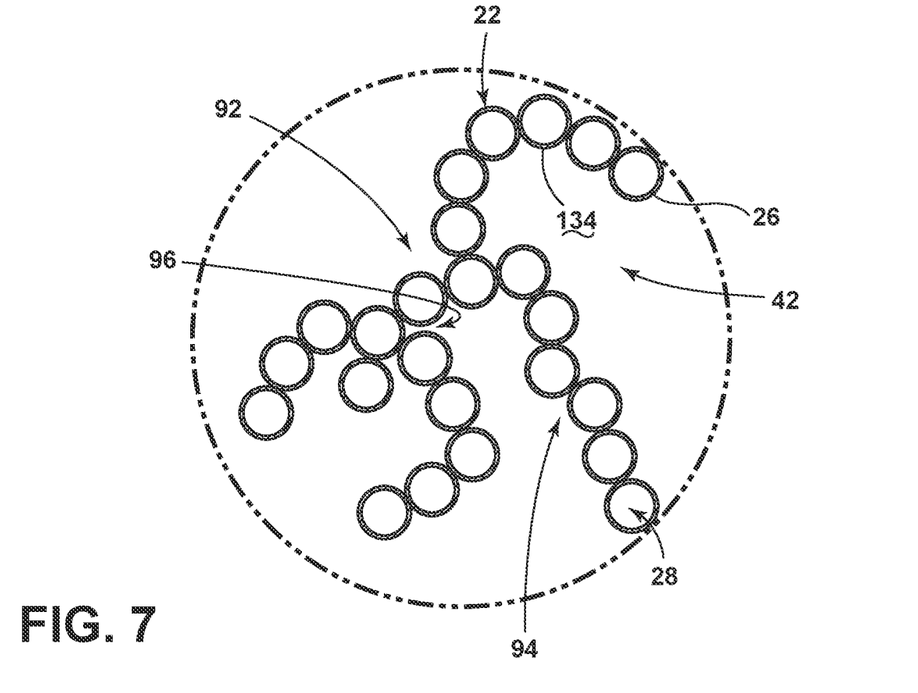
FIG. 7 is a cross-sectional view of an aspect of the super insulating nano-spheres configured in connected strands of hollow nano-spheres.
Figure 8:
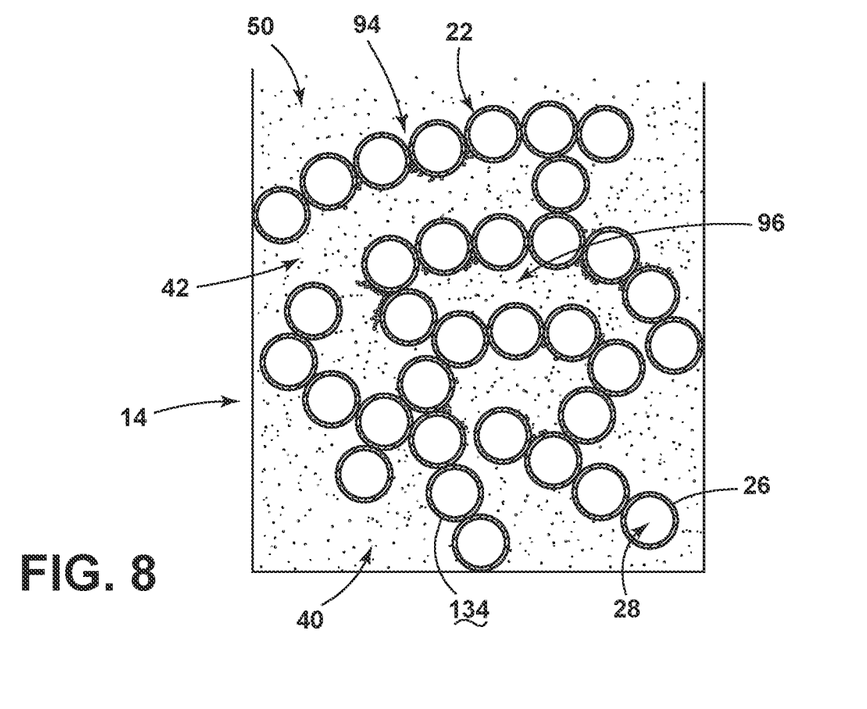
FIG. 8 is a cross-sectional view of an aspect of the super insulating nano-sphere material having the connected strands of hollow nano-spheres set within a fill material.
Figure 9:
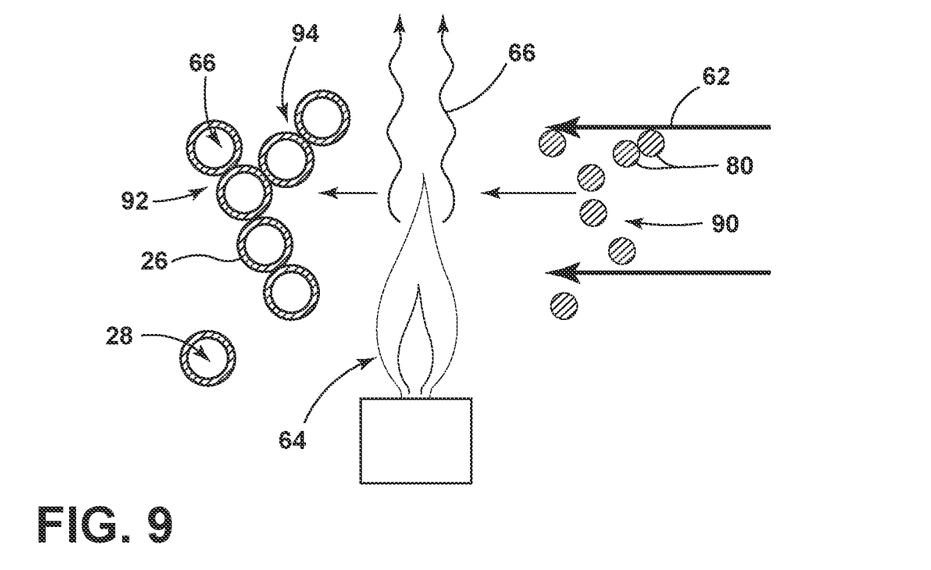
FIG. 9 is a schematic diagram illustrating a mechanism for forming super insulating nano-spheres into the connected strands of hollow nano-spheres.

Referring now to FIGS. 7-9, it is contemplated that when the nano-particles 80 are fed with the blowing agent 62 through the flame 64 to produce the hollow nano-spheres 22, the nano-particles 80 can be positioned in an agglomerated pattern 90 such that when the heated gas 66 causes expansion of the individual nano-particles 80, the individual nano-particles 80 engage, connect, fuse, or otherwise become attached with at least one other adjacent hollow nano-sphere 22. In this manner, the hollow nano-spheres 22 in the agglomerated pattern 90 can define a plurality of nano-sphere formations 92. It is contemplated that these nano-sphere formations 92 can include strands 94 of connected nano-spheres, clumps of nano-spheres, agglomerates of nano-spheres, or other accumulating patterns of hollow nano-spheres 22 that form various nano-sphere formations 92. It is contemplated that within these nano-sphere formations 92, the interstitial spaces 42 between the various hollow nano-spheres 22 of the nano-sphere formations 92 can define a configuration of small porous spaces 96 defined between the agglomerated hollow nano-spheres 22 of the nano-sphere formations 92. The porous spaces 96 of the nano-sphere formations 92 can provide thermal insulating properties. As discussed above, the various fill materials 40, including the various insulating gasses 50, can be inserted in and around the nano-sphere formations 92 such that the fill material 40 occupies each of the porous spaces 96, recesses, spaces, and other areas in and around each of the nano-sphere formations 92.

Referring again to FIGS. 3, 4 and 10, it is also contemplated that the nano-particles 80 can be fed through the flame 64 with the blowing agent 62 in a separated pattern 100, such that where the nano-particles 80 in the separated pattern 100 expand due to the released gas 66 as a result of decomposition of the blowing agent 62, the expansion of the nano-particles 80 creates individual hollow nano-spheres 22. It is contemplated that with the nano-particles 80 in the separated pattern 100, fewer hollow nano-spheres 22 become agglomerated, attached, or otherwise engaged with other hollow nano-spheres 22, such that a plurality of individual nano-spheres are formed or minimally sized nano-sphere formations 92, where the minimally sized nano-sphere formations 92 are substantially smaller than the nano-sphere formations 92 formed using the nano-particles 80 in the agglomerated pattern 90.

Figure 10:
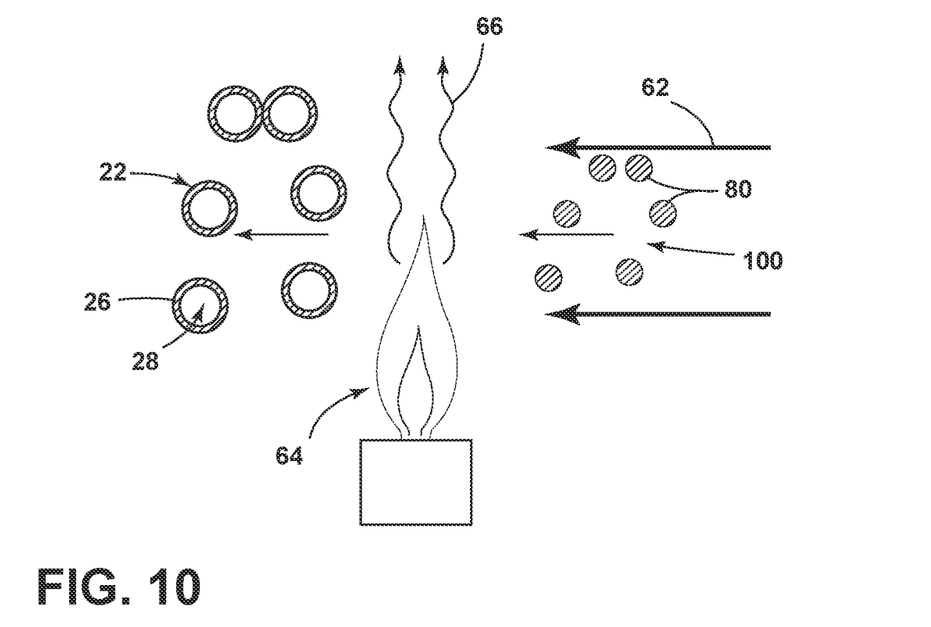
FIG. 10 is a schematic diagram illustrating a mechanism for forming individual super insulating nano-spheres.
Figure 11:
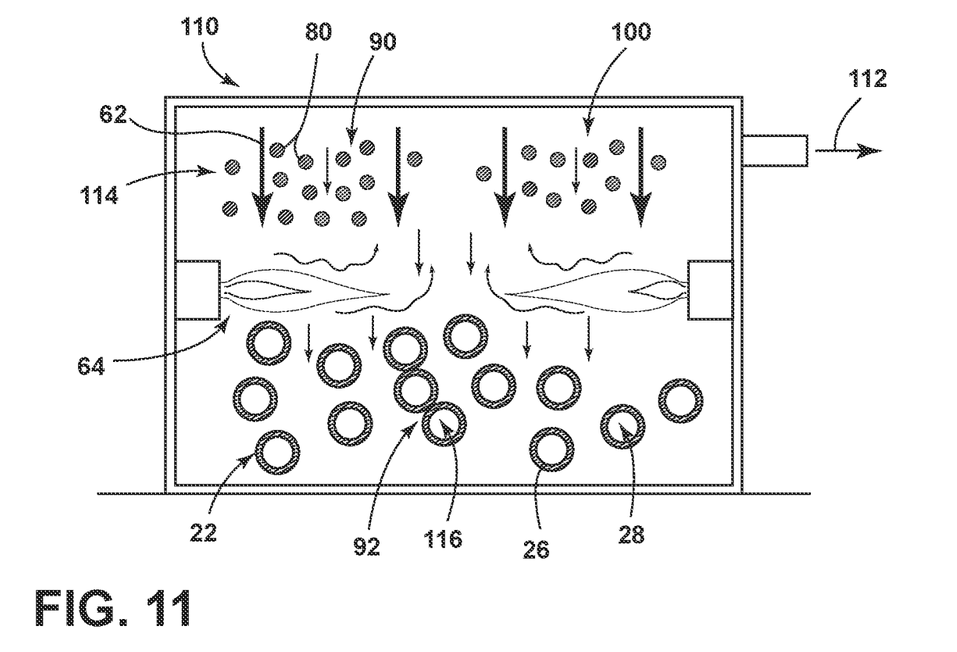
FIG. 11 is a schematic diagram illustrating a mechanism for forming super-insulating nano-spheres having a low pressure interior space.

According to the various embodiments, the degree of separation or agglomeration of the nano-particles 80 in the separated or agglomerated pattern 100, 90 can dictate the degree of formation of the various hollow nano-spheres 22 that form varying sizes of the nano-sphere formations 92. By way of example, and not limitation, a tighter packed agglomerated pattern 90 will result in larger nano-sphere formations 92, while a looser agglomerated pattern 90 or a separated pattern 100 can result in fewer nano-sphere formations 92 and/or nano-sphere formations 92 of diminished size and volume. It is contemplated that a separated pattern 100 of greatly spaced nano-particles 80 can result in individual hollow nano-spheres 22 that are unattached to any adjacent hollow nano-spheres 22 other than being packed in an adjacent configuration when disposed within an insulating cavity 16 of an insulating structure 12 of an appliance 10.

Referring again to FIGS. 3, 4 and 11, it is contemplated that the process of forming the hollow nano-spheres 22 by feeding the nano-particles 80 with the blowing agent 62 through the flame 64 can be performed in an at least partial vacuum 114 within a pressurized chamber 110 where at least a portion of the ambient gas 112 within the pressurized chamber 110 is removed. The pressurized chamber 110 can define at least partial vacuum 114 having a chamber pressure of approximately 1 millibar. In such an embodiment, after the hollow nano-spheres 22 are formed within the pressurized chamber 110, it is contemplated that a nano-sphere pressure 116 of the internal space 28 of each hollow nano-sphere 22, similar to the pressurized chamber 110, will be approximately 1 millibar as opposed to a typical internal pressure of approximately 300 millibars. Once the hollow nano-spheres 22 are formed, the pressurized internal space 28 of each hollow nano-sphere 22 will remain pressurized at a level similar to that of the pressurized chamber 110. The decreased pressure of each internal space 28 of each hollow nano-sphere 22 can serve to reduce gas conduction through the insulating material 14. Reduction in pressure by forming the hollow nano-spheres 22 within a pressurized chamber 110 can decrease the pressure of the internal space 28 of each hollow nano-sphere 22. Conventional microspheres 60 tend to have an internal pressure of from approximately 300 millibars to approximately 400 millibars.

Referring again to FIGS. 3, 4 and 11, forming the hollow nano-spheres 22 within the pressurized chamber 110 can significantly reduce the internal pressure of the internal space 28. It is contemplated that the pressurized chamber 110 can be maintained at varying pressure levels. However, in order to form the hollow nano-spheres 22, at least some ambient gas 112 or other gas 66 and/or insulating gas 50 is required within the pressurized chamber 110 in order to allow a flame 64 to be created that can decompose the blowing agent 62 and heat the nano-particles 80 to form the hollow nano-spheres 22. It is contemplated that the pressurized chamber 110 can be a vacuum chamber where a substantial portion of the ambient gas 112 within the vacuum chamber is removed where the nano-particles 80 can be fed through the flame 64 with the blowing agent 62 to form the hollow nano-spheres 22 having the depressurized internal space 28. It is contemplated that within the pressurized chamber 110, the nano-particles 80 can be fed through the flame 64 in the agglomerated or separated patterns 100, or combinations thereof.

Referring again to FIGS. 3-4 and 12, the fill material 40 that can be added to the hollow nano-spheres 22 can be defined by a nano-particle material 130. As discussed above, such nano-particle insulation can include, but is not limited to, fumed silica, precipitated silica, nano aerogel powder, pearlite, rice husk ash, diatomaceous earth and other similar insulating particles. It is contemplated that the nano-particle material 130 can be provided to define a uniform coating 132 to an exterior surface 134 of each of the hollow nano-spheres 22. In this manner, the nano-particle material 130 coated around the hollow nano-spheres 22 can serve to prevent the various hollow nano-spheres 22 from directly contacting each other and thereby reducing the solid conduction. It is contemplated that the nano-particle material 130 can include a range from approximately 1% to approximately 50% of the entire volume of insulating material 14. It is also contemplated that the nano-particle material 130 can be an opacifier that can serve to reduce radiation conductivity of the overall insulating material 14. In order to dispose the nano-particle materials 130 onto the hollow nano-spheres 22, the nano-particle material 130 and the hollow nano-spheres 22 can be thoroughly mixed to generate a well-coated mixture of the hollow nano-spheres 22 and nano-particle material 130. It is also contemplated that to receive the insulative nano-particle material 130, the exterior surface 134 of each of the hollow nano-spheres 22 can be prepared in order to cause the nano-particle material 130 to adhere to the exterior surface 134 of the hollow nano-spheres 22.

Figure 12:
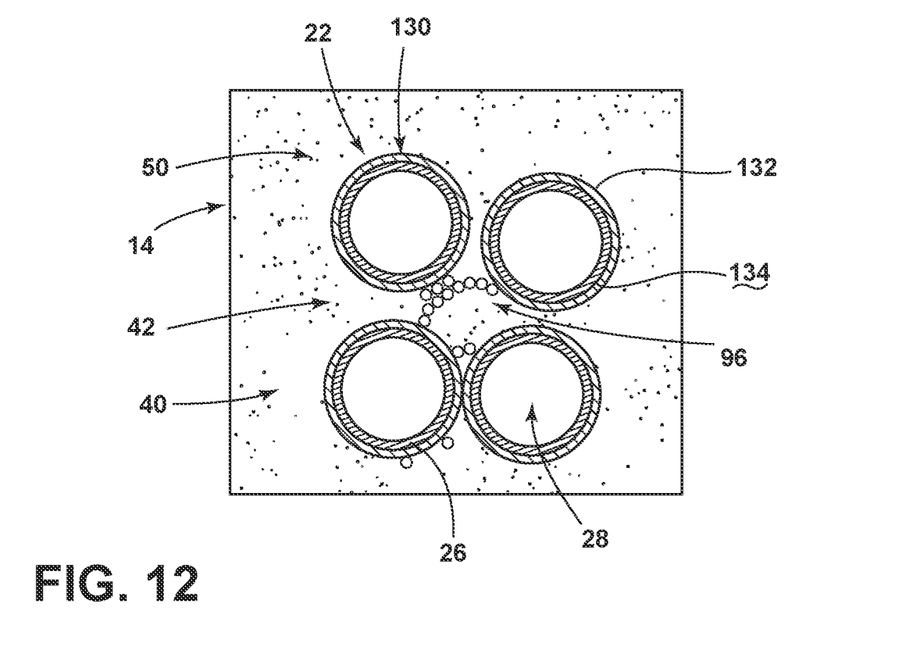
FIG. 12 is a cross-sectional view of an aspect of the super insulating nano-sphere material.
Figure 13:
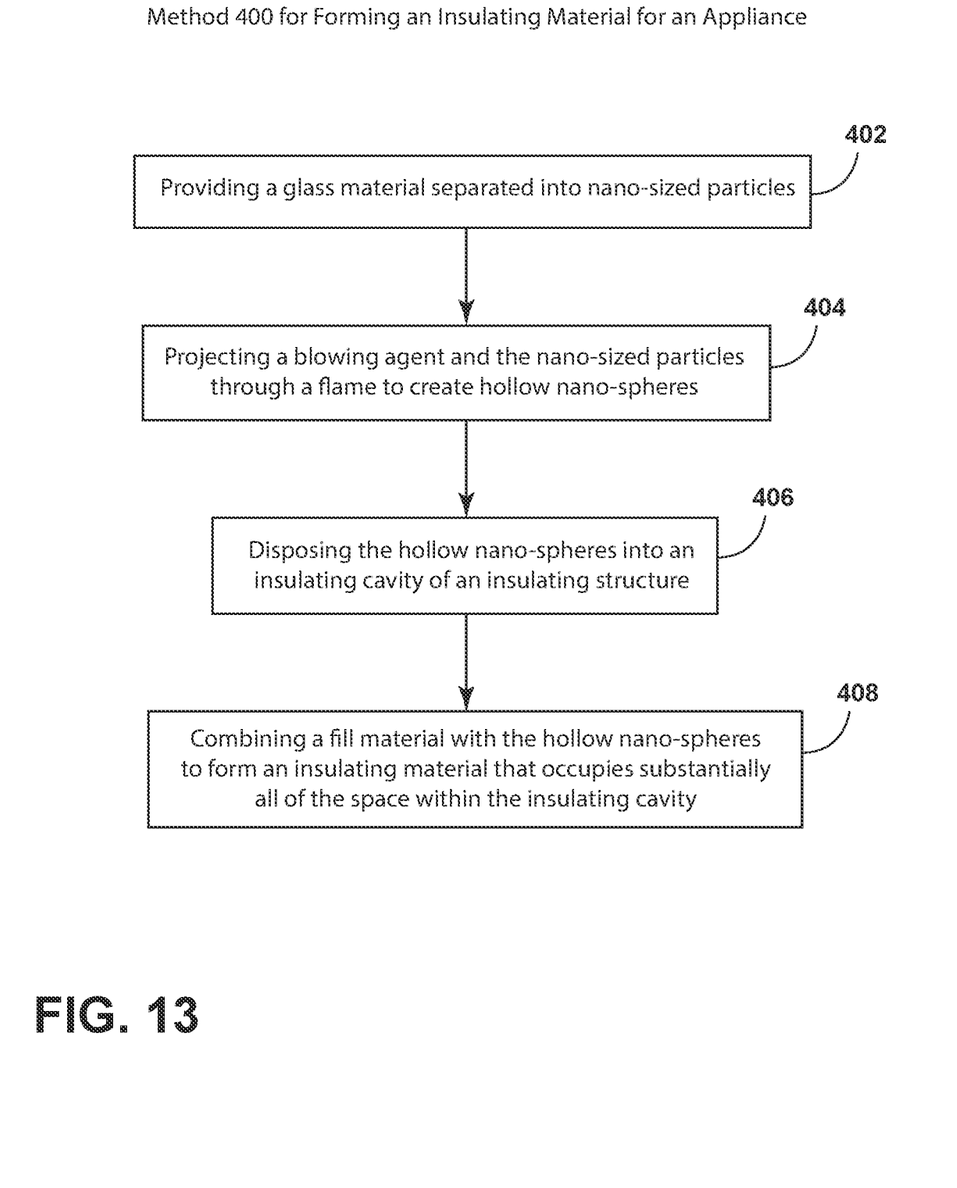
FIG. 13 is a schematic flow diagram illustrating an aspect of a method for forming an insulating material for an appliance.
Figure 14:
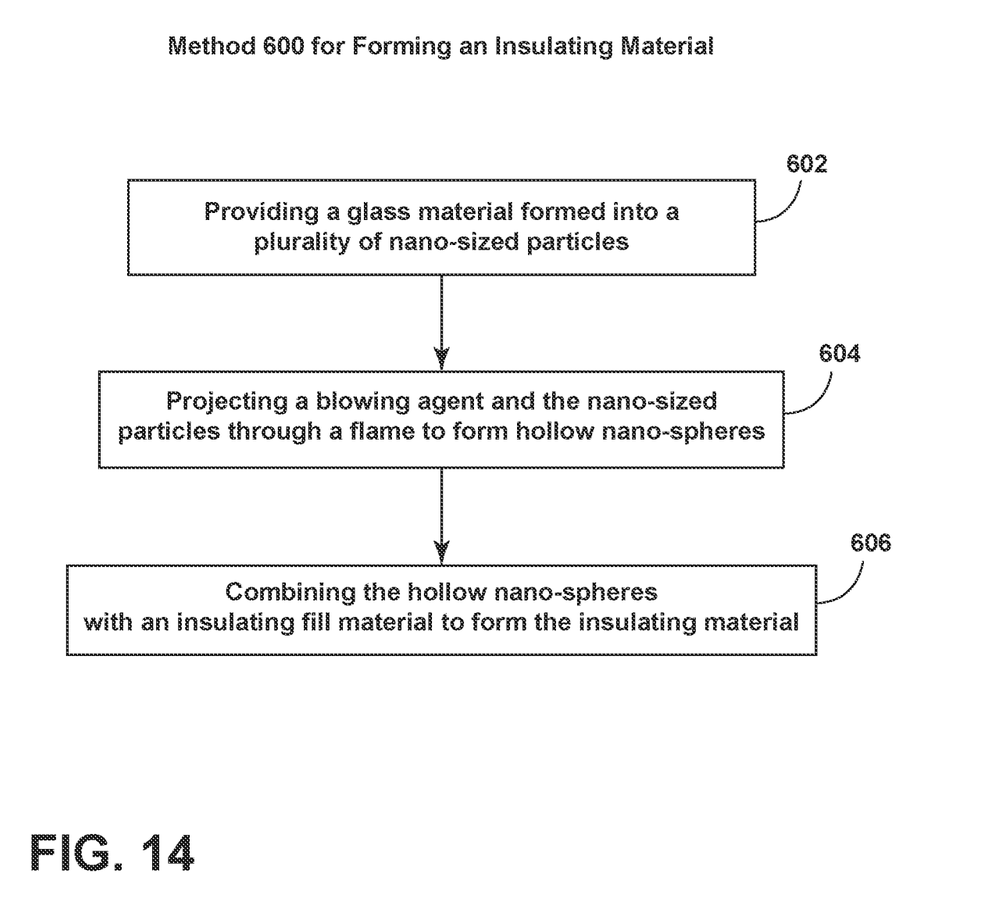
FIG. 14 is a schematic flow diagram illustrating another aspect of a method for forming insulating material.

According to the various embodiments, it is contemplated that the nano-particle material 130 can be added to the hollow nano-spheres 22 before being disposed within the insulating cavity 16 of the insulating structure 12. It is also contemplated that the nano-particle material 130 can be added with the hollow nano-spheres 22 within the insulating cavity 16 and a vibrating mechanism can be used to distribute the nano-particle material 130 around and between the hollow nano-spheres 22. It is further contemplated that the nano-particle material 130 can be carried into the insulating cavity 16 within a carrier of the insulating gas 50 such that the insulating gas 50 carries the nano-particle material 130 throughout the insulating cavity 16 and around and between the hollow nano-spheres 22 to substantially distribute the nano-particle material 130 throughout the insulating cavity 16 and in and around the various hollow nano-spheres 22 of the insulating material 14.

According to the various embodiments, combinations of the vibrating mechanism and the carrier of insulating gas 50 can be used to distribute the nano-particle insulating material 14 throughout the insulating cavity 16 of the appliance 10.

According to the various embodiments, each of the hollow nano-spheres 22 can include a super hydrophobic nature such that each of the hollow nano-spheres 22 substantially repels water and other fluid. In this manner, it is contemplated that the use of getters may be minimized within the insulative nano-particle material 130 as the hollow nano-spheres 22 can be configured to repel water and other fluids such that water and other fluids may be minimally present, if present at all within the nano-sphere insulating material 14.

Referring now to FIGS. 1-4 and 7-13, having described various aspects of the formation and configuration of the hollow nano-spheres 22, and the configuration of the nano-sphere insulating material 14, a method 400 is described herein for forming an insulating material 14 for use in an appliance 10. According to the method 400, a glass material is provided and is separated into the nano-particles 80 (step 402). As discussed above, the glass can be in the form of soda lime silicate, sodium borosilicate glass, various glasses, ceramics, combinations thereof, and other similar glass-type materials. The nano-particles 80 of glass can then be projected with a blowing agent 62 through a flame 64, where the nano-particles 80 are fed through the flame 64 with the blowing agent 62 (step 404). As discussed above, in passing through the flame 64, the blowing agent 62 decomposes and releases a heated gas 66 which, in turn, causes the nano-particles 80 to expand into corresponding hollow nano-spheres 22. Once the hollow nano-spheres 22 are formed, the hollow nano-spheres 22 can be disposed into an insulating cavity 16 of an insulating structure 12 of an appliance 10 (step 406). Referring again to FIGS. 3-4 and 7-13, it is contemplated that the method 400 can include disposing the fill material 40 into the insulating cavity 16 (step 408). As discussed above, the fill material 40 can substantially occupy, or fully occupy, various porous spaces 96 and/or interstitial spaces 42 defined between the hollow nano-spheres 22 and/or the connected strands 94 of hollow nano-spheres 22 that make up the nano-sphere formations 92. The fill material 40 can include at least one of powdered silica, granulated silica, other silica material, nano aerogel powder, pearlite, rice husk ash, diatomaceous earth, insulating gas 50, combinations thereof, and other similar insulating materials 14 that can be used to fill, or substantially fill, the insulating cavity 16 along with the hollow nano-spheres 22. As discussed above, the hollow nano-sphere 22 and fill material 40 can be placed in varying configurations within the insulating cavity 16 of the appliance 10.

According to the various embodiments, it is contemplated that the insulating structure 12 can be in the form of a cabinet 150 for the appliance 10, where the cabinet 150 includes an outer wrapper 18 and an inner liner 20 with the insulating cavity 16 defined therebetween. It is also contemplated that the insulating cavity 16 can be defined within a panel structure, where the microsphere insulating material 14 is disposed within the panel structure and sealed to form a vacuum insulated panel. In such an embodiment, the vacuum insulated panel can then be inserted into an appliance structure. The hollow nano-spheres 22 and fill material 40 can be disposed directly into the insulating cavity 16 and into direct engagement with the inner liner 20 and outer wrapper 18, or the panel structure, depending on the design of the insulating structure 12.

According to the various embodiments of the present device, it is contemplated that the insulating structure 12 of the appliance 10, whether a cabinet 150, or insulating panel, is to be hermetically sealed. Such a hermetic seal can prevent the escape of various insulating gasses 50 that tend to dissipate in an exterior environment. Accordingly, the hermetic seal of the insulating structure 12 confines the insulating gasses 50 within the insulating cavity 16 and substantially prevents dissipation of these gasses, that may diminish the insulating properties of the insulating structure 12.

Referring now to FIGS. 3-4, 7-11 and 13, another aspect of a method 600 for forming insulating material 14 is disclosed. According to the method 600, a glass material is provided and is formed into a plurality of nano-sized particles 80 (step 602). It is contemplated that the nano-sized particles 80 can have a diameter in the range of from approximately 5 nanometers to approximately 300 nanometers. According to the method 600, once the nano-sized particles 80 are formed, a blowing agent 62 is projected through a flame 64, where the nano-sized particles 80 are fed through the flame 64 along with the blowing agent 62 (step 604). As discussed above, the blowing agent 62 decomposes as it passes through the flame 64 and releases a heated gas 66. The heated gas 66, in turn, causes the nano-sized particles 80 to expand and form at least one internal space 28 within the nano-sized particles 80. The resulting formation is a hollow nano-sphere 22. As discussed above, the nano-particles 80 can be positioned in an agglomerated pattern 90, or a separated pattern 100, to form various configurations of hollow nano-spheres 22 in nano-sphere formations 92, in individual nano-spheres performing various configurations of the nano-sphere insulating material 14. According to the method 600, the various hollow nano-spheres 22, connected hollow nano-sphere formations 92, and individual nano-spheres can be combined with an insulating fill material 40, such that the combination of the hollow nano-spheres 22, and one or more of the varying configurations described above, along with the fill material 40, serve to substantially fill or entirely fill the insulating cavity 16 with the hollow nano-spheres 22 and fill material 40 (step 606). In this manner, the fill material 40 can substantially occupy or fully occupy the various porous spaces 96 between each of the hollow nano-spheres 22 and within each of the nano-sphere formations 92.

As discussed above, the combination of the hollow nano-spheres 22 and the particulate and gaseous fill material 40 serves to fill, or substantially fill, the insulating cavity 16 such that the insulating cavity 16 can be a substantially unitary insulating structure 12 for the appliance 10. The configuration of the hollow nano-spheres 22 and the fill material 40 within the insulating cavity 16 serves to increase the path of solid and gaseous conduction through the insulating cavity 16. In this manner, the transmission of thermal energy 44 through the insulating structure 12 can be minimized. Additionally, the resulting effect of the use of the insulating material 14 having hollow nano-spheres 22 can result in a decrease in the thickness of the insulating structure 12 such that additional amounts of storage space can be configured within the interior volume of the appliance 10. Alternatively, the interior volume of the appliance 10 can be maintained. Alternatively, the interior volume of the appliance 10 can be maintained and the insulating value of the microsphere material can greatly increase the thermal retention properties of the appliance 10 through the increased paths of solid and gaseous conduction through the nano-sphere insulating material 14.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulating material for an appliance insulating structure, the insulating material comprising:
   a plurality of hollow nano-spheres, wherein each hollow nano-sphere of the plurality of hollow nano-spheres has a wall that defines an internal space that defines an internal diameter of from approximately 40 nanometers to approximately 900 nanometers; and
   a fill material disposed within an interstitial space defined between the plurality of hollow nano-spheres, wherein the plurality of hollow nano-spheres define a plurality of nano-sphere formations, wherein each nano-sphere formation of the plurality of nano-sphere formations includes connected nano-spheres defining porous spaces between the connected nano-spheres, wherein the plurality of hollow nano-spheres are made from nano-particles of the insulating material, and wherein the nano-particles are made from at least one of soda-lime glass, borosilicate glass, fumed silica, precipitated silica, and powder aerogel.

2. The insulating material of claim 1, wherein the wall of each hollow nano-sphere has a thickness that is in a range of from approximately 1 percent to approximately 10 percent of an outside diameter of each hollow nano-sphere.

3. The insulating material of claim 1, wherein the fill material includes at least one of powdered silica, granulated silica, fumed silica, other silica material, nano aerogel powder, pearlite, rice husk ash, diatomaceous earth and insulating gas.

4. The insulating material of claim 1, wherein the internal space of each hollow nano-sphere defines an internal pressure of approximately 1 millibar.

5. The insulating material of claim 1, wherein the nano-particles of the insulating material have a diameter of from approximately 5 nanometers to approximately 300 nanometers.

6. The insulating material of claim 1, wherein a thickness of the wall is within a range of from approximately 0.5 nanometers to approximately 100 nanometers.

7. The insulating material of claim 1, wherein the internal space includes an insulating gas that includes at least carbon dioxide.

8. An insulating material for an appliance insulating structure, the insulating material comprising:
   a plurality of hollow nano-spheres, wherein each hollow nano-sphere of the plurality of hollow nano-spheres includes a diameter of less than approximately 1000 nanometers and has a wall that defines an internal space, and wherein the wall of each hollow nano-sphere has a thickness that is less than approximately 100 nanometers, wherein a coating is applied to exterior surfaces of the plurality of hollow nano-spheres, wherein the coating maintains the exterior surfaces of each hollow nano-sphere to be separated from the remaining hollow nano-spheres of the plurality of hollow nano-spheres; and a fill material disposed within an interstitial space defined between the plurality of hollow nano-spheres, wherein the fill material includes at least one of perlite and a silica-based material.

9. The insulating material of claim 8, wherein the internal space includes an insulating gas that is contained within each hollow nano-sphere, wherein the insulating gas includes at least carbon dioxide.

10. The insulating material of claim 8, wherein the internal space of each hollow nano-sphere defines an internal pressure of approximately 1 millibar.

11. The insulating material of claim 8, wherein the plurality of hollow nano-spheres are made from nano-particles of the insulating material.

12. The insulating material of claim 11, wherein the nano-particles of the insulating material have a diameter of from approximately 5 nanometers to approximately 300 nanometers.

13. The insulating material of claim 12, wherein the nano-particles are made from at least one of soda-lime glass, borosilicate glass, fumed silica, precipitated silica, and powder aerogel.

14. The insulating material of claim 8, wherein the plurality of hollow nano-spheres define a plurality of nano-sphere formations, wherein each nano-sphere formation of the plurality of nano-sphere formations includes strands of connected nano-spheres defining porous spaces between the strands of the connected nano-spheres.

15. An insulating material for an appliance insulating structure, the insulating material comprising:
a plurality of hollow nano-spheres, wherein each hollow nano-sphere of the plurality of hollow nano-spheres has a wall that defines an internal space, the wall having a thickness of less than approximately 100 nanometers and the internal space having an interior diameter of less than 900 nanometers, and wherein the plurality of hollow nano-spheres define a plurality of nano-sphere formations, wherein each nano-sphere formation of the plurality of nano-sphere formations includes connected nano-spheres defining porous spaces between the connected nano-spheres, wherein the plurality of hollow nano-spheres are made from nano-particles of the insulating material, wherein the nano-particles of the insulating material have a diameter of from approximately 5 nanometers to approximately 300 nanometers; and
a fill material mixed with the plurality of hollow nano-spheres, wherein the fill material is disposed in an interstitial space defined between the plurality of hollow nano-spheres.

16. The insulating material of claim 15, wherein the fill material includes an insulating gas and the insulating gas includes at least one of carbon dioxide, neon, krypton and xenon.

17. The insulating material of claim 15, wherein the fill material includes at least one of powdered silica, granulated silica, fumed silica, other silica material, nano aerogel powder, pearlite, rice husk ash, diatomaceous earth and insulating gas.

18. The insulating material of claim 15, wherein the wall of each hollow nano-sphere has a thickness that is in a range of from approximately 1 percent to approximately 10 percent of an outside diameter of each hollow nano-sphere.

19. The insulating material of claim 15, wherein the plurality of hollow nano-spheres are made from nano-particles of the insulating material.

20. The insulating material of claim 19, wherein the nano-particles are made from at least one of soda-lime glass, borosilicate glass, fumed silica, precipitated silica, and powder aerogel.

\* \* \* \* \*